United States Patent [19]

Gunn

[11] 4,227,770
[45] Oct. 14, 1980

[54] SUBMARINE FIBER OPTIC CABLE

[75] Inventor: Duncan A. Gunn, Great Dunmow, England

[73] Assignee: International Standard Electric Corporation, New York, N.Y.

[21] Appl. No.: 907,988

[22] Filed: May 22, 1978

[30] Foreign Application Priority Data

May 31, 1977 [GB] United Kingdom ............... 22936/77

[51] Int. Cl.³ .............................................. G02B 5/16
[52] U.S. Cl. ................................ 350/96.23; 174/70 R
[58] Field of Search ............... 350/96.23, 96.22, 96.21; 174/70 R

[56] References Cited

U.S. PATENT DOCUMENTS

| 3,498,286 | 3/1970 | Polanyi et al. | 350/96.23 X |
| 3,966,299 | 6/1976 | Osterfield et al. | 350/96.21 |
| 4,081,208 | 3/1978 | Meade | 350/96.23 X |

FOREIGN PATENT DOCUMENTS

| 2312788 | 12/1976 | France | 350/96.23 |
| 1470890 | 4/1977 | United Kingdom | 350/96.23 |

OTHER PUBLICATIONS

George A. Wilkins, "Fiber Optic Cables for Undersea Communications", in *Fiber and Integrated Optics,* vol. 1, No. 1, Jan. 1977, Crane, Russak & Company Inc., pp. 39-61.

*Primary Examiner*—Stewart J. Levy
*Attorney, Agent, or Firm*—Thomas L. Peterson

[57] ABSTRACT

A fiber optic cable has a central strength member formed by a wire with helical grooves in each of which is laid an insulated optical fiber. Steel wires are wound over the strength member plus fibers with the direction of lay of the wires opposite to that of the helical grooves so as not to crush the fibers. Also described is a jointing technique for a pair of such cables.

2 Claims, 3 Drawing Figures

SUBMARINE FIBER OPTIC CABLE

BACKGROUND OF THE INVENTION

The present invention relates to optical fiber cables, especially for use in high pressure environments, such as for underwater use.

Optical fibers are now well known for use in telecommunications, and the need has arisen for such fibers to be incorporated into cables for use in difficult environments. One such environment in undersea use, where high pressures are encountered, and where it is desirable to prevent the ingress of water. An object of the invention is to provide an optical fiber cable for such difficult environments.

SUMMARY OF THE INVENTION

According to one aspect of the present invention, there is provided an optical fiber cable which includes a central strength member which helically formed with a plurality of grooves. There is provided a plurality of optical fibers each of which is enclosed in an electrically insulating material. Each of the optical fibers is laid in one of said grooves. The strength member and the optical fibers laid in the grooves thereon are enclosed in a sheath.

According to another aspect of the present invention, there is provided a joint for optical fiber cables each of which has a central strength member surrounded by a plurality of optical fibers, an inner sheath and an outer sheath. Each fiber is enclosed in an electrically insulating material. The other sheath is removed from the ends of the two cables and each end is fitted into a ferrule with an outwardly-extending flange. The optical fibers in each cable are bared at the ends thereof. The bared ends of the fiber in each cable are respectively coupled in an optical coupling member. Two semi-cylindrical coupling members are fitted over the two cable ends and the optical coupling member, with the flanges on the ferrules each received in a groove on the inner face of the coupling formed by said two semi-cylindrical members.

DESCRIPTION OF THE PREFERRED EMBODIMENT

Figure 1:
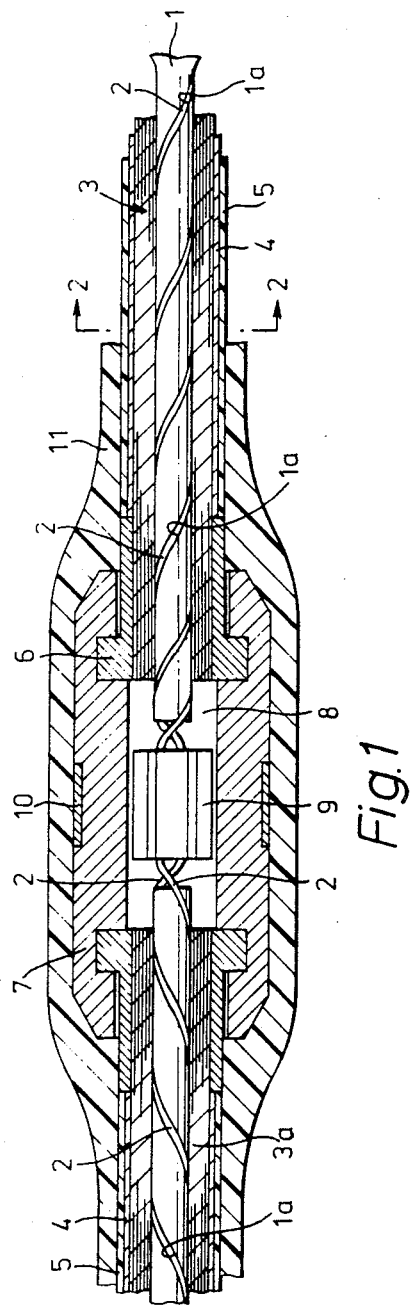
FIG. 1 is a longitudinal cross-section of two cables embodying the invention joined according to the invention.
Figure 3:
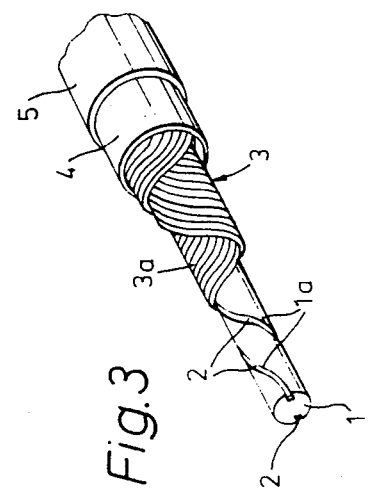
FIG. 3 is a perspective view of one end of the cable shown in FIG. 2, with portions of the various layers of the cable removed to show the next inside layer.
Figure 2:
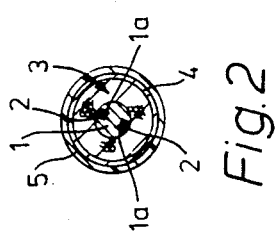
FIG. 2 is a transverse cross-section taken along line 2—2 of FIG. 1 showing the optical fiber cable of the invention.

Referring now to the drawing in detail, we will first describe the construction of the cable. The cable has a central strength member 1 formed by a metallic wire which is helically grooved, the number of grooves being determined by the number of fibers to be accommodated in the cable. Two grooves 1a are shown by way of example only. An insulated optical fiber 2 is laid into each of the grooves 1a. Several layers (three being shown) of steel wire 3 are wound around the central member and thus over the optical fibers. The function of the wires 3 is to provide the cable with the required strength. To prevent crushing of the optical fibers by the steel wires, the direction of lay of the first layer 3a (see FIG. 3) of steel wires is opposite to that of the grooves on the strength member, and hence, also opposite to the direction of lay of the optical fibers.

A copper tabe 4 is formed around the assembly formed by the strength member with the fibers and the steel wires. The tape seam is welded and drawn down tightly around the steel strands. The functions of the copper tape are (a) to provide the electrically conductive path needed for the supply of electrical power of the regenerators or cables needed along the cables' length and (b) to provide a hermetic seal against the ingress of water or other contaminants.

An insulating layer 5 of a suitable plastic material is extruded around the sheath provided by the copper tabe 4. The thickness of the insulating layer is determined by the electrical requirements of the cable. If necessary, the cable can be protected from damage by the application, outside the layer 5, of a final wrapping of steel or another protective coating.

We now consider the techniques for jointing two cables each of which is described above. The ends of the cables to be jointed are each prepared by removing the plastic insulation to expose the copper covered steel strands 3. Then a tubular metallic ferrule 6 is placed over each prepared end and collapsed onto the steel strands, e.g., by a rotary swaging operation.

The cable ends each with its fitted ferrule are located with their flanges in recesses in a split coupling 7 formed by two substantially semi-cylindrical members of, for instance metal. This coupling provides the means of transmitting the axial load along the cable, and also provides a pressure resistant chamber 8 in which an optical coupling device 9 is lcoated. This device 9 can take any one of a number of possible forms and, hence, is not described herein. Bared ends of the optical fibers 2 are joined together within this coupling device 8. Note that the ends of the two cables' strength members 1 both project into the chamber 8.

The two halves of the split coupling 7 are fastened together with a belly band clip 10 as shown, or by counter-sunk screws which extend through the wall thickness of the coupling.

Finally a plastic sheath 11 is molded round the joint so as to amalgamate with the cables' plastic sheath and, thus, form a water-tight electrically insulating barrier.

What is claimed is:

1. An optical fiber cable comprising:
   a central strength member formed by a metallic wire having formed on its outer surface a plurality of helical grooves;
   a single optical fiber laid in each of said grooves;
   each optical fiber being enclosed in an electrically insulating material;
   one or more layers of metallic wires wound helically over said fibers and said strength member, the direction of lay of all the wires of at least the layer of wires immediately adjacent said optical fibers being opposite to that of said grooves and said fibers laid therein to avoid crushing of said fibers by said wires; and
   a sheath surrounding said strength member and said optical fibers laid in said grooves thereon.

2. An optical fiber cable comprising:
   a central metallic strength member having a plurality of helical grooves formed thereon;
   a single optical fiber laid in each of said grooves;

each optical fiber being enclosed in an electrically insulating material;

one or more layers of metallic wires wound helically over said strength member and said fibers;

the direction of lay of all the wires of at least the layer of wires immediately adjacent said optical fibers being opposite to that of said grooves and said fibers laid therein;

a metallic sheath formed around said layer of wires or the outermost layer of wires if there are more than one such layer; and a layer of an electrically insulating material formed over said metallic sheath.

* * * * *